Sept. 13, 1927. W. BEY 1,642,098
STEAM GENERATOR
Filed Dec. 15, 1926
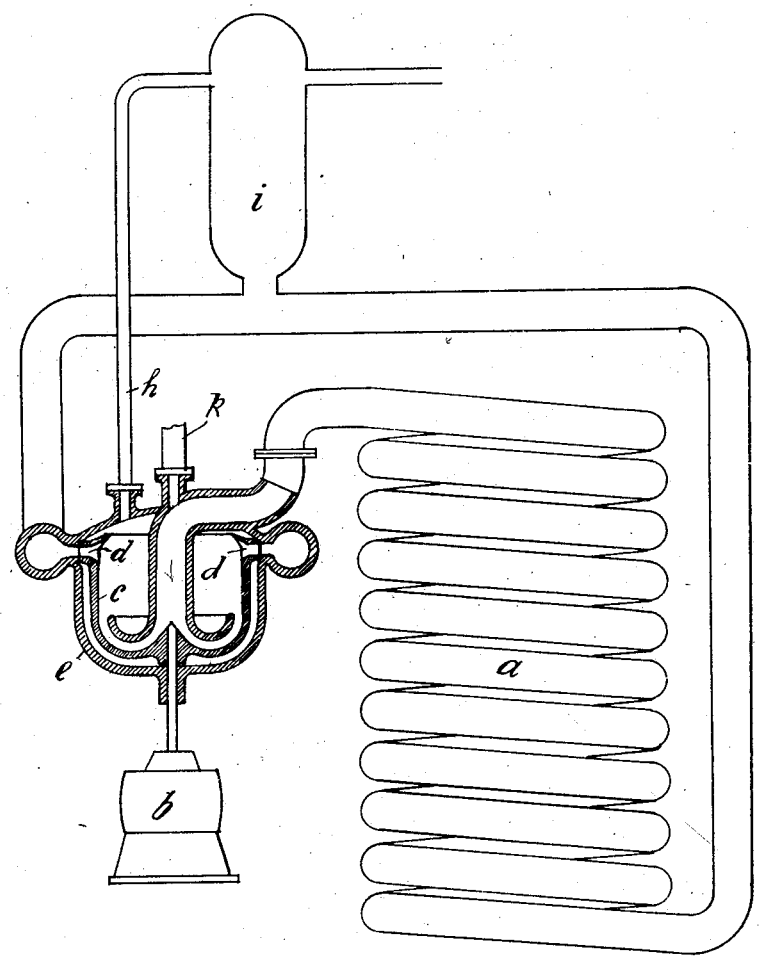
Inventor:
Wilhelm Bey Patented Sept. 13, 1927.

1,642,098

UNITED STATES PATENT OFFICE.

WILHELM BEY, OF ALTONA-ON-THE-ELBE, GERMANY.

STEAM GENERATOR.

Application filed December 15, 1926, Serial No. 154,953, and in Germany October 5, 1925.

This invention relates to a steam generator and consists in the provision of a heat-interchanging coil through which the water is circulated by means of a centrifugal separator which at the same time separates off and delivers the steam, the separator being provided with a rotor having vanes adapted to perform a pumping action.

The invention is illustrated diagrammatically in the accompanying drawing.

The water is heated by any suitable means in a pipe coil $a$ which is connected at the top to the intake and at the bottom to the outflow of a centrifugal separator $e$ driven by a motor $b$. The rotor $c$ of the separator is fitted with vanes $d$ enabling it to act as a rotary pump for circulating the water through the pipes and through the coil $a$. Sufficient pressure and speed is kept up for maintaining the coil $a$ full of water and preventing steam separation in the latter so that no parts of the coil will be exposed to overheating. The steam is separated off in the central chamber of the separator $e$ and led away through a pipe $h$. A storage chamber $i$ for water and steam surmounts the apparatus and communicates with the lower end of the coil. The pipe $h$ leads into the steam space of the chamber $i$ whence the steam passes off to the place of consumption.

By effecting the steam separation entirely in the separator in this manner, there is no need, in the case of large generators for very high pressure, to have a correspondingly large steam space and evaporation surface. Several separators may be employed in connection with a single heat-interchanging coil.

The feed water is supplied through a pipe $k$.

I claim:

A steam generator comprising a centrifugal separator including a rotor having vanes adapted to perform a pumping action, a heat-interchanging coil communicating at the top with the intake and at the bottom with the outflow of said separator, a storage chamber surmounting the apparatus and communicating with the bottom end of the coil, and a steam pipe leading from the separator to the upper part of said storage chamber.

WILHELM BEY.